United States Patent [19]

Wollenberg

[11] Patent Number: 4,713,188

[45] Date of Patent: Dec. 15, 1987

[54] CARBONATE TREATED HYDROCARBYL-SUBSTITUTED AMIDES

[75] Inventor: Robert H. Wollenberg, San Rafael, Calif.

[73] Assignee: Chevron Research Company, San Francisco, Calif.

[21] Appl. No.: 818,575

[22] Filed: Jan. 10, 1986

[51] Int. Cl.⁴ .......................................... C10M 129/00
[52] U.S. Cl. ........................... 252/51.5 A; 252/51.5 R
[58] Field of Search ...................... 252/51.5 A, 51.5 R

[56] References Cited

U.S. PATENT DOCUMENTS

| | | | |
|---|---|---|---|
| 2,802,022 | 8/1957 | Grogzoz et al. | 260/471 |
| 2,991,162 | 7/1961 | Malec | 44/58 |
| 3,367,943 | 2/1968 | Miller et al. | 260/326.3 |
| 3,373,111 | 3/1968 | Le Suer et al. | 252/51.5 |
| 3,652,240 | 3/1972 | Dorn et al. | 44/66 |
| 4,584,117 | 4/1986 | Wollenberg | 252/51.5 A |
| 4,585,566 | 4/1986 | Wollenberg | 252/51.5 A |
| 4,612,132 | 9/1986 | Wollenberg et al. | 252/51.5 A |
| 4,624,681 | 11/1986 | Wollenberg | 44/63 |

FOREIGN PATENT DOCUMENTS 689705   4/1953   United Kingdom .

*Primary Examiner*—William R. Dixon, Jr.
*Assistant Examiner*—Cynthia A. Prezlock
*Attorney, Agent, or Firm*—R. C. Gaffney; S. R. LaPaglia; G. F. Swiss

[57] ABSTRACT

Disclosed are additives which are useful as dispersants in marine crankcase oils and hydraulic oils, lubricating oils. In particular, disclosed are hydrocarbyl-substituted amides having at least one primary or secondary amino group which have been modified by treatment with a cyclic carbonate.

10 Claims, No Drawings

CARBONATE TREATED HYDROCARBYL-SUBSTITUTED AMIDES

FIELD OF THE INVENTION

Lubricating oil additives are prepared by reacting a hydrocarbyl-substituted amide dispersant containing at least one primary or secondary amino group with a cyclic carbonate.

DESCRIPTION OF THE PRIOR ART

Most commercial lubricating oils now contain dispersant additives to help keep the engine clean by dispersing sludge and varnish-forming deposits in the oil. Many of these dispersant additives contain basic nitrogen as primary or secondary amino groups.

Primary and secondary amino groups of a succinimide dispersant have been previously modified by treatment with an alkylene oxide (see U.S. Pat. Nos. 3,373,111 and 3,367,943).

U.S. Pat. No. 2,991,162 discloses carburetor detergent additive for gasoline obtained by reacting an N-alkylpropylene diamine having up to about 32 carbon atoms in the alkyl group with ethylene carbonate and derivatives thereof to produce a two-component detergent additive consisting of a carbamate and a urea compound.

U.S. Pat. No. 3,652,240 discloses carburetor detergent additives which are carbamates formed by the reaction of a compound of the formula

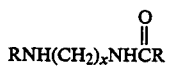

$$RNH(CH_2)_xNHCR$$

wherein R is a hydrocarbyl radical having from about 12 to 20 carbon atoms and x is an integer of from 2 to 4 with ethylene carbonate and alkyl-substituted ethylene carbonate.

British Pat. No. 689,705 discloses that the reaction product of an amine, a polyamine or an alkyl, arylalkyl or aryl substituted amine or polyamine with ethylene carbonate may be employed directly or in the form of transformation products as anti-parasites; plastic materials; plasticizers; auxiliaries for textiles, leather, paper, etc.; surface-active agents; cosmetic products and as improvers for fuel and lubricants.

SUMMARY OF THE INVENTION

The present invention is directed toward the discovery that the lubricating oil dispersant performance of hydrocarbyl-substituted amides is improved by reaction with a cyclic carbonate. Accordingly, the present invention is directed toward a lubricating oil composition comprising an oil of lubricating viscosity and a dispersant effective amount of a compound prepared by the process comprising contacting at a temperature sufficient to cause reaction a hydrocarbyl-substituted amide having at least one primary or secondary amino group with a cyclic carbonate wherein the molar charge of the cyclic carbonate to the basic nitrogens of the hydrocarbyl-substituted amide is from about 0.2:1 to about 10:1.

DETAILED DESCRIPTION OF THE INVENTION

The modified hydrocarbyl-substituted amides of this invention are prepared by reaction of a hydrocarbyl-substituted amide having at least one primary or secondary amino group with a cyclic carbonate. The reaction is conducted at a temperature sufficient to cause reaction of the cyclic carbonate with the primary or secondary amino group of the hydrocarbyl-substituted amide. In particular, reaction temperatures of from about 0° C. to about 250° C. are preferred with temperatures of from about 100° C. to 200° C. being most preferred.

The reaction may be conducted neat—that is, both the hydrocarbyl-substituted amide and the carbonate are combined in the proper ratio, either alone or in the presence of a catalyst, such as an acidic, basic or Lewis acid catalyst, and then stirred at the reaction temperature. Examples of suitable catalysts include, for instance, boron trifluoride, alkane sulfonic acid, alkali or alkaline carbonate.

Alternatively, the reaction may be conducted in a diluent. For example, the reactants may be combined in a solvent such as toluene, xylene, oil or the like, and then stirred at the reaction temperature. After reaction completion, volatile components may be stripped off. When a diluent is employed, it is preferably inert to the reactants and products formed and is generally used in an amount sufficient to insure efficient stirring.

Water, which can be present in the dispersant, may be removed from the reaction system either before or during the course of the reaction via azeotroping or distillation. After reaction completion, the system can be stripped at elevated temperatures (100° C. to 250° C.) and reduced pressure to remove any volatile components which may be present in the product.

Mole ratios of the cyclic carbonate to the basic amine nitrogen of the hydrocarbyl-substituted amide employed in the process of this invention are generally in the range of from about 0.2:1 to about 10:1, although preferably from about 0.5:1 to about 5:1 and most preferably 1:1 to 3:1.

The reaction is generally complete from within 0.5 to 10 hours.

A. Carbonates

Cyclic carbonates employed in this invention react with a basic primary or secondary amine to form either a corresponding carbamate or a hydroxyalkylamine derivative. Suitable cyclic carbonates include:

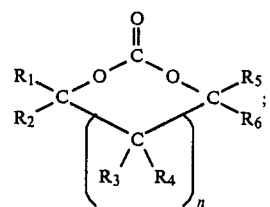

(1)

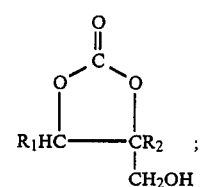

(2)

-continued

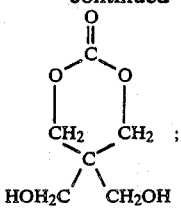
(3)

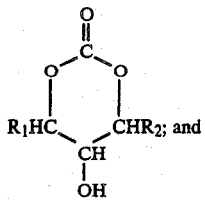
(4)

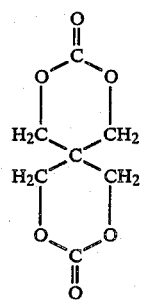
(5)

wherein $R_1$, $R_2$, $R_3$, $R_4$, $R_5$ and $R_6$ are independently selected from hydrogen or lower alkyl of 1 to 2 carbon atoms; and n is an integer from 0 to 1.

Preferred cyclic carbonates for use in this invention are those of formula 1 above. Preferred $R_1$, $R_2$, $R_3$, $R_4$, $R_5$ and $R_6$ are either hydrogen or methyl. Most preferably $R_1$, $R_2$, $R_3$, $R_4$, $R_5$ and $R_6$ are hydrogen, when n is one. $R_6$ is most preferably hydrogen or methyl while $R_1$, $R_2$, and $R_5$ are hydrogen when n is zero.

The following are examples of suitable cyclic carbonates for use in this invention: 1,3-dioxolan-2-one(ethylene carbonate); 4-methyl-1,3-dioxolan-2-one(propylene carbonate); 4-hydroxymethyl-1,3-dioxolan-2-one; 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one;4,5-diethyl-1,3-dioxolan-2-one; 4,4-diethyl-1,3-dioxolan-2-one;1,3-dioxan-2-one; 4,4-dimethyl-1,3-dioxan-2-one; 5,5-dimethyl-1,3-dioxan-2-one; 5,5-dihydroxymethyl-1,3-dioxan-2-one; 5-methyl-1,3-dioxan-2-one; 4-methyl-1,3-dioxan-2-one; 5-hydroxy-1,3-dioxan-2-one; 5,5-diethyl-1,3-dioxan-2-one; 5-methyl-5-propyl -1,3-dioxan-2-one; 4,6-dimethyl-1,3-dioxan-2-one; 4,4,6-trimethyl-1,3-dioxan-2-one and spiro[1,3-oxa-2-cyclohexanone -5,5'-1',3'-oxa-2'-cyclohexanone].

Several of these cyclic carbonates are commercially available such as 1,3-dioxolan-2-one or 4-methyl-1,3-dioxolan-2-one. Cyclic carbonates may be readily prepared by known reactions. For example, reaction of phosgene with a suitable alpha alkane diol or an alkan-1,3-diol yields a carbonate for use within the scope of this invention. See, for instance, U.S. Pat. No. 4,115,206 which is incorporated herein by reference for its teaching of the preparation of cyclic carbonates.

Likewise, the cyclic carbonates useful for this invention may be prepared by transesterification of a suitable alpha alkane diol or an alkan-1,3-diol with, e.g., diethyl carbonate under transesterification conditions. See, for instance, U.S. Pat. Nos. 4,384,115 and 4,423,205 which are incorporated herein by reference for their teaching of the preparation of cyclic carbonates.

As used herein, the term "alpha alkane diol" means an alkane group having two hydroxyl substituents wherein the hydroxyl substituents are on adjacent carbons to each other. Examples of alpha alkane diols include 1,2-propanediol; 2,3-butanediol and the like.

The term "alkan-1,3-diol" means an alkane group having two hydroxyl substituents wherein the hydroxyl substituents are beta substituted. That is, there is a methylene or a substituted methylene moiety between the hydroxyl substituted carbons. Examples of alkan-1,3-diols include propan-1,3-diol, pentan-2,4-diol and the like.

As used herein, the term "spiro[1,3-oxa-2-cyclohexanone -5,5'-1',3'-oxa-2'cyclohexanone]" means

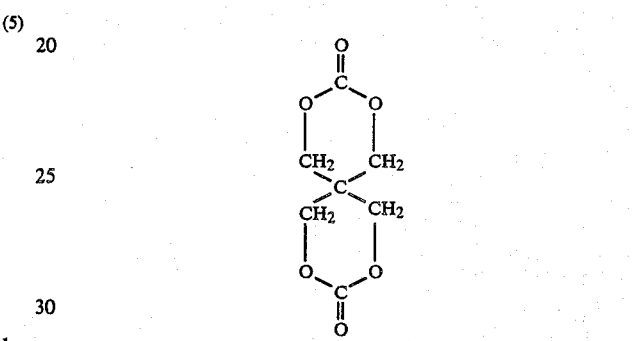

As used herein, the term "molar charge of cyclic carbonate to the basic nitrogen of the hydrocarbyl-substituted amide" means that the molar charge of cyclic carbonate employed in the reaction is based upon the theoretical number of basic nitrogens (i.e., nitrogens titratable by a strong acid) contained in the hydrocarbyl-substituted amide. Thus, when 1 equivalent of triethylene tetraamine (TETA) is reacted with an equivalent of hydrocarbyl-substituted carboxylic acid, the resulting amide will theoretically contain 3 basic nitrogens. Accordingly, a molar charge of 1 would require that a mole of cyclic carbonate be added for each basic nitrogen or in this case 3 moles of cyclic carbonate for each mole of amide prepared from TETA.

The alpha alkane diols, used to prepare the 1,3-dioxolan-2-ones employed in this invention, are either commercially available or may be prepared from the corresponding olefin by methods known in the art. For example, the olefin may first react with a peracid, such as peroxyacetic acid or hydrogen peroxide to form the corresponding epoxide which is readily hydrolyzed under acid or base catalysis to the alpha alkane diol. In another process, the olefin is first halogenated to a dihalo derivative and subsequently hydrolyzed to an alpha alkane diol by reaction first with sodium acetate and then with sodium hydroxide. The olefins so employed are known in the art.

The alkan-1,3-diols, used to prepare the 1,3-dioxan-2-ones employed in this invention, are either commercially available or may be prepared by standard techniques, e.g., derivatizing malonic acid.

4-Hydroxymethyl-1,3-dioxolan-2-one derivatives and 5-hydroxy-1,3-dioxan-2-one derivatives may be prepared by employing glycerol or substituted glycerol in the process of U.S. Pat. No. 4,115,206. The mixture so prepared may be separated, if desired, by conventional techniques. Preferably the mixture is used as is.

5,5-Dihydroxymethyl-1,3-dioxan-2-one may be prepared by reacting an equivalent of pentaerythritol with an equivalent of either phosgene or diethylcarbonate (or the like) under transesterification conditions.

Spiro[1,3-oxa-2-cyclohexanone-5,5'-1',3'-oxa-2'-cyclohexanone may be prepared by reacting an equivalent of pentaerythritol with two equivalents of either phosgene or diethylcarbonate (or the like) under transesterification conditions.

B. Hydrocarbyl-Substituted Amide

The hydrocarbyl-substituted amide whose performance is improved by the process of this invention must contain at least one basic nitrogen and have at least one >NH group. The essence of this invention resides in the surprising discovery that treating the hydrocarbyl-substituted amides with a cyclic carbonate improves its lubricating oil dispersant properties.

Hydrocarbyl-substituted amide compositions suitable as starting materials for preparing the products of this invention are known in the art. Typical of such compounds are those disclosed in U.S. Pat. No. 3,405,064, the disclosure of which is hereby incorporated by reference. These compositions are ordinarily prepared by reacting a hydrocarbyl-substituted carboxylic acid, or anhydride ester thereof, having at least 12 to about 350 carbon atoms to render the molecule oil soluble, with a polyamine, to give a mono- or polycarboxylic acid amide. Preferred are those amides prepared from (1) a carboxylic acid of the formula $R_7COOH$, where $R_7$ is $C_{12-20}$ alkyl or a mixture of this acid with a polyisobutenyl carboxylic acid or diacid in which the polyisobutenyl group contains from 22 to 128 carbon atoms, and (2) a polyamine.

The hydrocarbyl radical may be aliphatic or alicyclic and, except for adventitious amounts of aromatic structure in petroleum mineral oils, will be free of aromatic unsaturation. The hydrocarbyl groups will normally be branched-chain aliphatic, having 0-2 sites of unsaturation, and preferably from 0-1 site of ethylene unsaturation. The hydrocarbyl groups are preferably derived from petroleum mineral oil, or polyolefins, either homopolymers or higher-order polymers, or 1-olefins of from 2-6 carbon atoms. Ethylene is preferably copolymerized with a higher olefin to insure oil solubility.

Illustrative polymers include polypropylene, polyisobutylene, poly-1-butene, etc. The polyolefin group will normally have at least 1 branch per 6 carbon atoms along the chain, preferably at least 1 branch per 4 carbon atoms along the chain. These branched-chain hydrocarbons are readily prepared by the polymerization of olefins of from 3-6 carbon atoms and preferably from olefins of from 3-4 carbon atoms.

In preparing the compositions of this invention, rarely will a single compound having a defined structure be employed. With both polymers and petroleum-derived hydrocarbon groups, the composition is a mixture of materials having various structures and molecular weights. Therefore, in referring to molecular weight, average molecular weights are intended. Furthermore, when speaking of a particular hydrocarbon group, it is intended that the group include the mixture that is normally contained within materials which are commercially available. For example, polyisobutylene is known to have a range of molecular weights and may include small amounts of very-high-molecular-weight materials.

Particularly preferred hydrocarbyl-substituted amides are prepared from polyisobutenyl carboxylic acid.

The polyamine employed to prepare the hydrocarbyl-substituted amide is preferably a polyamine having from 2 to about 12 amine nitrogen atoms and from 2 to about 40 carbon atoms. The polyamine is reacted with a hydrocarbyl carboxylic acid to produce the hydrocarbyl-substituted amide, employed in this invention. The polyamine is so selected so as to provide at least one primary or secondary amine in the hydrocarbyl-substituted amide. The polyamine preferably has a carbon-to-nitrogen ratio of from about 1:1 to about 10:1.

Since the reaction with the cyclic carbonate is believed to efficiently proceed through a primary or secondary amine, at least one of the basic amine nitrogens of the polyamine moiety should be a primary or secondary amine.

The polyamine portion of the hydrocarbylsubstituted amide may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms.

At least one of the substituents on one of the amines of the polyamino moiety is hydrogen, e.g., at least one of the basic nitrogens is a primary or secondary amino nitrogen atom.

Hydrocarbyl, as used in describing the polyamine components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxy alkyls, such as 2-hydroxyethyl, 3-hydroxypropyl, hydroxyisopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substituents are hydrogen, $C_1-C_6$ alkyls, and $C_1-C_6$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and polysubstituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethylpropylene, trimethylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydrocarbyl-substituted polyamines. Among the polyalkylene polyamines, those containing 2-12 amine nitrogen atoms and 2-24 carbon atoms are especially preferred, and the $C_2$–$C_5$ alkylene polyamines are most preferred, in particular, the lower polyalkylene polyamines, e.g., ethylene diamine, dipropylene triamine, etc.

The polyamine component also may contain heterocyclic polyamines, heterocyclic substituted amines and substituted heterocyclic compounds, wherein the heterocycle comprises one or more 5-6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, 1,2-bis-(N-piperazinyl)ethane, and N,N'-bis(N-piperazinyl)piperazine, 2-methylimidazoline, 3-aminopiperidine, 2-aminopyridine, 2-($\beta$-aminoethyl)-3-pyrroline, 3-aminopyrrolidine, N-(3-aminopropyl)morpholine, etc. Among the heterocyclic compounds, the piperazines are preferred.

Typical polyamines that can be used to form the compounds of this invention include the following: ethylene diamine, 1,2-propylene diamine, 1,3-propylene diamine, diethylene triamine, triethylene tetramine, hexamethylene diamine, tetraethylene pentamine, methylaminopropylene diamine, N-(betaaminoethyl)piperazine, N,N'-di(betaaminoethyl)piperazine, N,N'-di(-beta-aminoethyl)imidazolidone-2, N-(beta-cyanoethyl)ethane-1,2-diamine, 1,3,6,9-tetraaminooctadecane, 1,3,6-triamino-9-oxadecane, N-(beta-aminoethyl)ethanolamine, N-methyl-1,2-propanediamine, 2-(2-aminoethylamino)-ethanol.

Another group of suitable polyamines are the propyleneamines, (bisaminopropylethylenediamines). Propyleneamines are prepared by the reaction of acrylonitrile with an ethyleneamine, for example, an ethyleneamine having the formula $H_2N(CH_2CH_2NH)_ZH$ wherein Z is an integer from 1 to 5, followed by hydrogenation of the resultant intermediate. Thus, the product prepared from ethylene diamine and acrylonitrile would be $H_2N(CH_2)_3NH(CH_2)_2NH(CH_2)_3NH_2$.

In many instances the polyamine used as a reactant in the production of hydrocarbyl-substituted amide of the present invention is not a single compound but a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be largely tetraethylene pentamine and the empirical formula of the total amine composition will closely approximate that of tetraethylene pentamine. Finally, in preparing the hydrocarbyl-substituted amides for use in this invention, where the various nitrogen atoms of the polyamine are not geometrically equivalent, several substitutional isomers are possible and are encompassed within the final product. Methods of preparation of polyamines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volumes 2, pp. 99–116.

The preferred hydrocarbyl-substituted amides used in this invention are represented by the formula:

(II)

wherein $R_7$ is hydrocarbyl of from about 12 to 350 carbon atoms; $R_8$ is alkylene of from 2 to 6 carbon atoms; and a is an integer of from 1 to about 10.

Preferably, $R_7$ in II above is derived from $C_{12-20}$ aliphatic carboxylic acid or a mixture of this acid with a polyisobutenyl carboxylic acid or diacid in which the polyisobutenyl group contains from 22 to 128 carbon atoms. Preferably, $R_8$ is alkylene of from 2 to about 6 carbon atoms and a is preferably an integer from 1 to about 6.

C. Modified Dispersant Complexes

Cyclic carbonates of Formula 1 are used to illustrate the reaction of the carbonate with a hydrocarbyl-substituted amide. It is to be understood that the other cyclic carbonates employed in this invention react similarly. Cyclic carbonates react with the primary and secondary amines of a hydrocarbyl-substituted amide to form two types of compounds. In the first instance, strong bases, including unhindered amines such as primary amines and some secondary amines, react with an equivalent of cyclic carbonate to produce a carbamic ester as shown in reaction (1) below:

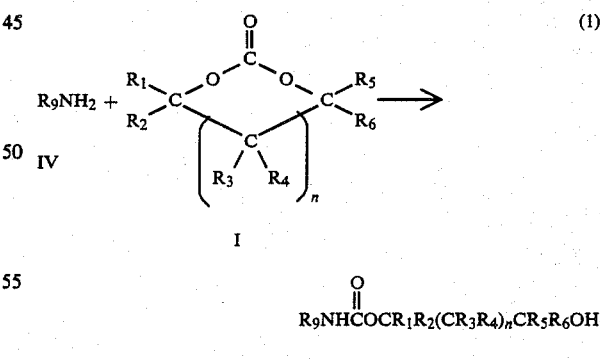

wherein $R_1$, $R_2$, $R_3$, $R_4$, $R_5$, $R_6$ and n are as defined above and $R_9$ is the remainder of a hydrocarbyl-substituted amide. In this reaction, the amine nitrogen has been rendered nonbasic by formation of the carbamate, V.

In the second instance, hindered bases, such as hindered secondary amines, may react with an equivalent of the same cyclic carbonate to form a hydroxyalkyleneamine linkage with the concomitant elimination of $CO_2$ as shown below in reaction (2):

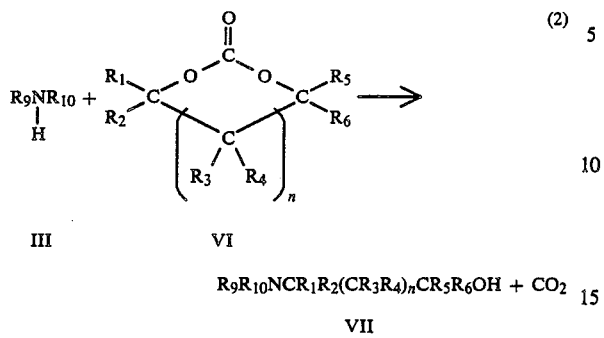

$$R_9R_{10}NCR_1R_2(CR_3R_4)_nCR_5R_6OH + CO_2$$
VII wherein $R_1$, $R_2$, $R_3$, $R_4$, $R_5$, $R_6$, $R_9$ and n are as defined above and $R_{10}$ is an alkyl or alkylene linking group which hinders the amine. Unlike the carbamate products of reaction (1), the hydroxyalkyleneamine products of reaction (2) retain their basicity. These hydroxyalkyleneamine derivative, VII, (when n=0) are believed to be similar to those which are produced by the addition of a substituted ethylene oxide of the formula:

VIII wherein $R_1$, $R_2$, $R_5$ and $R_6$ are as defined above. (See for instance U.S. Pat. Nos. 3,367,943 and 3,377,111).

In theory, if only primary and secondary amines are employed a determination of whether the carbonate addition follows reaction (1) or reaction (2) could be made by monitoring the AV (alkalinity value or alkalinity number—refers to the amount of base as milligrams of KOH in 1 gram of a sample) of the product. Accordingly, if the reaction proceeded entirely via reaction (1) above, a reaction product prepared by reacting an equivalent of carbonate for each basic nitrogen should yield an AV of zero. That is to say that all the basic amines in the polyamine moiety have been converted to nonbasic carbamates.

However, alkylene polyamines such as triethylene tetraamine and tetraethylene pentamine, contain tertiary amines (piperazines, etc.) which may account for as much as 30% of the basic nitrogen content. Although Applicant does not want to be limited to any theory, it is believed that these tertiary amines, although basic, are not reactive with the carbonate. Accordingly, even if the reaction proceeded entirely by reaction (1) above, an AV of approximately 30% of the original AV may be retained in the final product of such a polyamine. Nevertheless, a large drop in the AV of the product is significant evidence that a substantial portion of the reaction product contains carbamic esters.

In fact, the addition of the first molar charge of ethylene carbonate to the hydrocarbyl-substituted amide results in an appreciable lowering of the AV of the product.

The addition of a second molar charge of ethylene carbonate in these reactions does not result in appreciably further lowering of the AV. This suggests that the additional carbonate either reacts via reaction (2) above to form hydroxyalkyleneamine groups or are reacting with the hydroxyl group of the carbamate as shown in reaction 3(a) below:

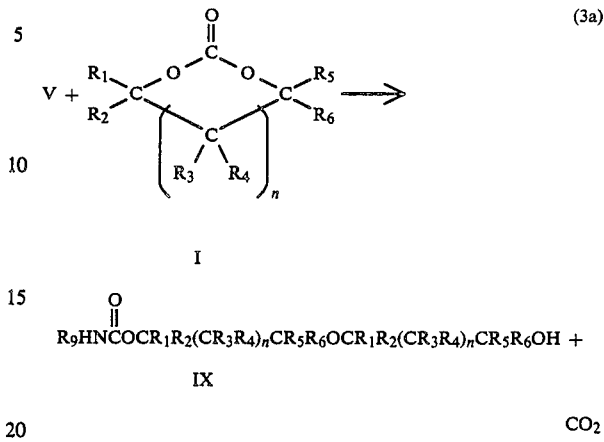

$$R_9HNCOCR_1R_2(CR_3R_4)_nCR_5R_6OCR_1R_2(CR_3R_4)_nCR_5R_6OH +$$
IX $$CO_2$$

wherein $R_1$, $R_2$, $R_3$, $R_4$, $R_5$, $R_6$, $R_9$ and n are as defined above.

The process of reaction 3(a) allows for additional carbonate to add to the hydroxyl group of product IX as shown in reaction 3(b) below:

$$IX + I \longrightarrow \tag{3(b)}$$

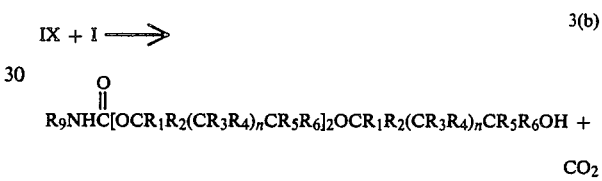

$$CO_2$$

wherein $R_1$, $R_2$, $R_3$, $R_4$, $R_5$, $R_6$ and $R_9$ are as defined above. As is apparent from the above reaction, the poly(oxyalkylene) portion of the carbamate can be repeated several times simply by addition of more carbonate.

Likewise, additional equivalents of carbonate could equally add to the hydroxyl group of the hydroxyalkyleneamine derivative, VII, of reaction (2) as shown in reaction (4) below:

$$VII + I \longrightarrow R_9R_{10}N[CR_1R_2(CR_3R_4)_nCR_5R_6O]_2H \tag{4}$$

XI wherein $R_1$, $R_2$, $R_3$, $R_4$, $R_5$, $R_6$, $R_9$ and $R_{10}$ are as defined above. Repeating the process of reaction (4) above by the addition of increasing amounts of carbonate produces a hydroxyalkylenepoly(oxyalkylene)amine derivative of Formula XII below:

$$R_9R_{10}N[CR_1R_2(CR_3R_4O)_nCR_5R_6]_yH \qquad XII$$

wherein $R_1$, $R_2$, $R_3$, $R_4$, $R_5$, $R_6$, $R_9$, $R_{10}$ and n are as defined above and y is an integer from 3 to 10.

It is also contemplated that reactions (3) and (4) above may also produce acyclic carbonate linkages with the terminal hydroxyl group. Likewise, if $R_9$ (or $R_{10}$) is hydrogen, then an additional hydroxyalkylene could add to the amino group.

Accordingly, it is expected that the reaction of a cyclic carbonate with a hydrocarbyl-substituted amide will yield a mixture of products. When the molar charge of the cyclic carbonate to the basic nitrogen of the hydrocarbyl-substituted amide is about 1 or less, it is anticipated that a large portion of the primary and secondary amines of the dispersant will have been converted to carbamic esters with some hydroxyalkyleneamine derivatives also being formed. As the molar charge is raised above 1 (i.e., from greater than 1 to about 10 equivalents of cyclic carbonate to the basic amine of the hydrocarbyl-substituted polyamine), poly(oxyalkylene) polymers of the carbamic esters and the hydroxyalkyleneamine derivatives are expected.

It is expected that use of the spiro[1,3-oxa-2-cyclohexanone-5,5'-1',3'-oxa-2'-cyclohexanone] will yield materials which would be both internally cyclized and cross-linking between two dispersant molecules.

In some instances, it may be desirable to increase the proportion of carbamic esters formed in these reactions. This may be accomplished by employing a hydrocarbyl-substituted amide with a large percentage of primary amine. Another method may be to employ alkyl-substituted (i.e., one or more of $R_1$, $R_2$, $R_3$, $R_4$, $R_5$, or $R_6$ is alkyl) or hydroxyalkyl substituted carbonates.

The modified hydrocarbyl-substituted amides of this invention can be reacted at a temperature sufficient to cause reaction with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to the modified dispersant may be employed.

The modified dispersants of this invention are useful as detergent and dispersant additives when employed in lubricating oils. When employed in this manner, the modified dispersant additive is usually present in from 0.2 to 10 percent by weight to the total composition and preferably at about 0.5 to 5 percent by weight. The lubricating oil used with the additive compositions of this invention may be mineral oil or synthetic oils of lubricating viscosity and preferably suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity such as didodecyl benzene, can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Additive concentrates are also included within the scope of this invention. The concentrates of this invention usually include from about 90 to 10 weight percent of an oil of lubricating viscosity and from about 10 to 90 weight percent of the complex additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Other additives which may be present in the formulation include rust inhibitors, foam inhibitors, corrosion inhibitors, metal deactivators, pour point depressants, antioxidants, and a variety of other well-known additives.

It is also contemplated the modified dispersants of this invention may be employed as dispersants and detergents in hydraulic fluids, marine crankcase lubricants and two-cycle engine oil and the like. When so employed, the modified dispersant is added at from about 0.1 to 10 percent by weight to the oil. Preferably, at from 0.5 to 5 weight percent.

The following examples are offered to specifically illustrate this invention. These examples and illustrations are not to be construed in any way as limiting the scope of this invention.

EXAMPLES

Example 1

To a 500 ml reaction flask was charged 100 g of an amide detergent composition prepared from an aliphatic carboxylic acid of approximately 280 molecular weight and tetraethylenepentamine (where the ratio of carboxylic acid to polyamine is about 3 to 1 and having an AV=102). The amide was heated to 170° C. under $N_2$ and 16.5 g ethylene carbonate was added. The reaction mixture was then stirred at 170° C. for 4 hours. Recovered 112 g product having an AV=70.9 and containing 5.89% N.

Example 2

To a 500 ml reaction flask is charged 100 g of an amide detergent composition prepared from an aliphatic carboxylic acid of approximately 280 molecular weight and tetraethylenepentamine (where the ratio of carboxylic acid to polyamine is about 3:1). The amide is heated to 170° C. under $N_2$ and 19.1 g of propylene carbonate is added. The reaction mixture is then stirred at 170° C. for 4 hours to yield a propylene carbonate modified amide of this invention.

What is claimed is:

1. A lubricating oil composition comprising an oil of lubricating viscosity and a dispersant effective amount of a product prepared by the process which comprises contacting at a temperature sufficient to cause reaction a hydrocarbyl-substituted amide of the formula

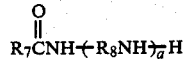

wherein
$R_7$ is hydrocarbyl of from 12 to 350 carbon atoms;

$R_8$ is alkylene of from 2 to 6 carbon atoms;

and a is an integer from 1 to 10;

with a cyclic carbonate wherein the molar charge of the cyclic carbonate to the basic nitrogen of the hydrocarbyl-substituted amide is from about 0.2:1 to about 10.1.

2. A lubricating oil composition as defined in claim 1 wherein the cyclic carbonate is selected from the group consisting of:

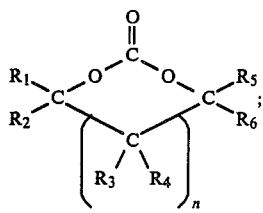
(1)

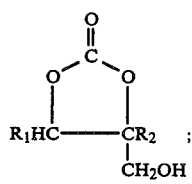
(2)

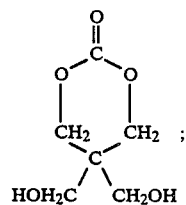
(3)

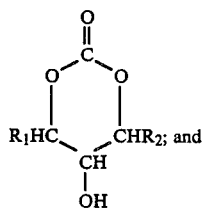
(4)

-continued

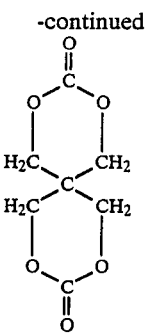
(5)

wherein $R_1$, $R_2$, $R_3$, $R_4$, $R_5$ and $R_6$ are independently selected from hydrogen or alkyl of 1 to 2 carbon atoms; and n is an integer from 0 to 1.

3. A lubricating oil composition as defined in claim 2 wherein the cyclic carbonate is

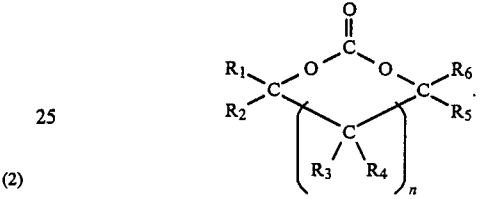

4. A lubricating oil composition as defined in claim 3 wherein n is zero and $R_1$, $R_2$, $R_5$ are hydrogen and $R_6$ is hydrogen or methyl.

5. A lubricating oil composition as defined in claim 4 wherein $R_7$ is derived from a $C_{12-20}$ aliphatic carboxylic acid or a mixture of this acid with a polyisobutenyl carboxylic acid or diacid in which the polyisobutenyl group contains from 22 to 128 carbon atoms.

6. A lubricating oil composition as defined in claim 5 wherein $R_8$ is alkylene of from 2 to 3 carbon atoms and a is an integer of from 1 to about 6.

7. A lubricating oil composition as defined in claim 6 wherein the reaction is conducted at from 0° to 250° C.

8. A lubricating oil composition as defined in claim 7 wherein the molar charge of the cyclic carbonate to the basic nitrogens of the dispersant is from about 0.5:1 to about 5:1.

9. A lubricating oil composition as defined in claim 7 wherein the molar charge of the cyclic carbonate to the basic nitrogens of the dispersant is from greater than 1:1 to about 10:1.

10. A lubricating oil concentrate comprising from about 90 to about 10 weight percent of an oil of lubricating viscosity and from about 10 to about 90 weight percent of a compound as defined in claim 1.

* * * * *